July 23, 1935. C. J. McCOY Re. 19,652

CHRISTMAS TREE LIGHT ORNAMENT

Original Filed Feb. 6, 1933

INVENTOR.
CURTISS J. McCOY.

BY
Lockwood Lockwood Goldsmith & Galt
ATTORNEYS.

Reissued July 23, 1935 Re. 19,652

UNITED STATES PATENT OFFICE 19,652

CHRISTMAS TREE LIGHT ORNAMENT

Curtiss J. McCoy, Indianapolis, Ind.

Original No. 1,972,687, dated September 4, 1934, Serial No. 655,367, February 6, 1933. Application for reissue October 13, 1934, Serial No. 748,242

9 Claims. (Cl. 240—10.1)

This invention relates to an attachment for lights particularly used upon Christmas trees, holiday wreaths, and the like.

The chief object of the invention is to provide an attachment which is arranged for suitable mounting and which provides a pivot adapted to rotatably support a shade construction.

The chief feature of the invention consists in the formation of the support per se.

Another feature of the invention consists in the formation of the shade whereby the same is not only rotatable by the heat of the source of illumination but which is so constructed that it creates the appearance of a plurality of rotating jewels.

When applied to a tree the intermittent directional discharge of light rays creates the highly ornamental appearance of apparent movement of the tree ornaments and tree limbs.

The full nature of the invention will be understood from the accompanying drawing and the following description and claims:—

In the drawing, Fig. 1 is a side elevation of a portion of a top of a Christmas tree provided with an electric lighting system and herein each of the lamp structures is provided with an automatically rotatable shade.

Figure 1:
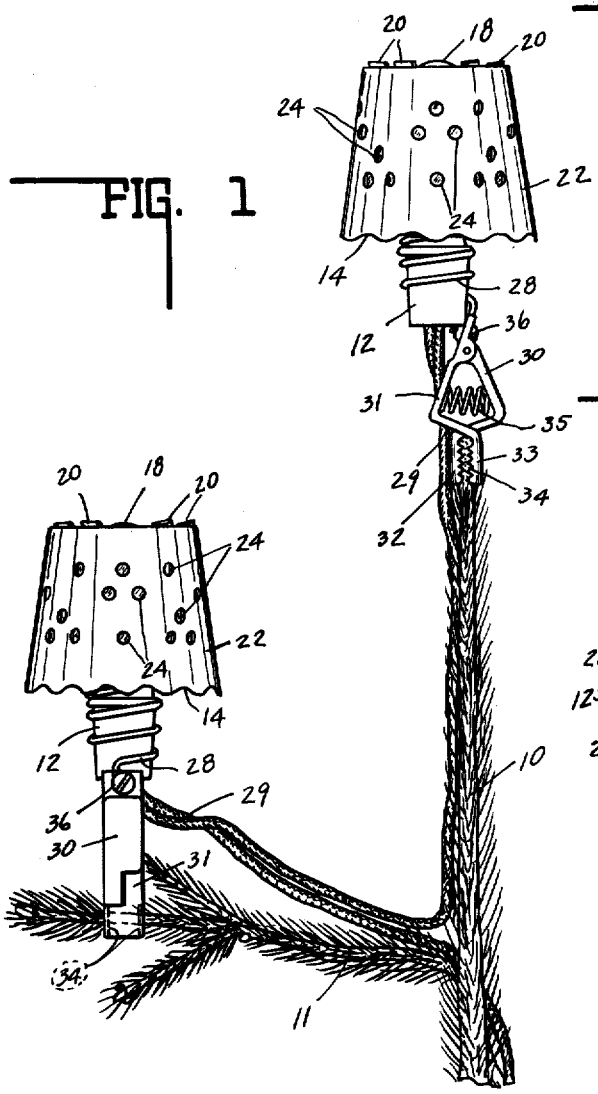
Figure 2:
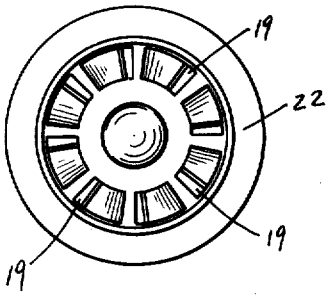
Fig. 2 is a top plan view of the shade construction.
Figure 3:
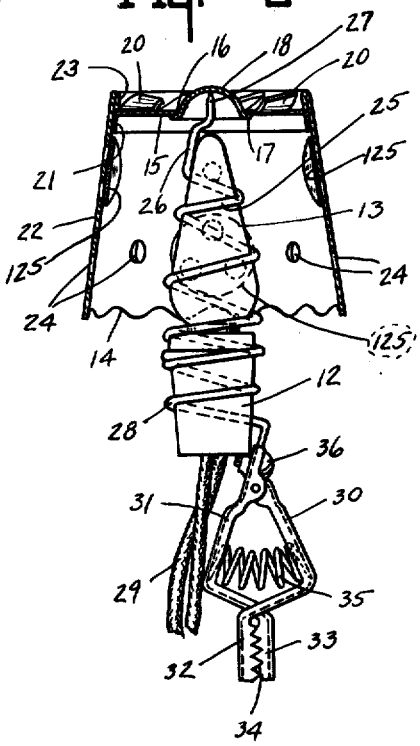
Fig. 3 is an enlarged vertical sectional view through the shade, the anchorage including a pivot, the socket, and bulb being shown in elevation.

In the drawing, 10 indicates the trunk of a Christmas tree, or the like, and 11 a branch. 12 indicates a pair of light bulb receiving sockets, in each of which is mounted a light bulb, indicated in Fig. 3 by the numeral 13.

The shade is of frusto-conical character and includes a scalloped lower edge 14, a closed top construction 15, centrally apertured at 16 and associated therewith and mounted in the aperture is a bearing member or seat 17 having a partially spherical surface 18, and the same is preferably made of glass which may be formed by heating a flat disc and depressing the central portion into partially spherical formation.

Concentric with the seat is a plurality of annularly arranged apertures 19, each of which is formed by punching out a portion 20. Portions 20 constitute vanes and are inclined with respect to the plane of the top 15. The outer edge of the top is turned downwardly as at 21 and forms a reenforcing rim for the body portion 22 of the shade. The top edge of the shade is turned back as at 23 and thus the shade at its connection with the top is reenforced and the reversed portion 23 is herein shown of sufficient height to substantially protect the upwardly inclined vanes 20. The shade and the top except for the partially spherical seat may be made of paper board or the like.

The shade may be suitably apertured as at 24 and upon the inner surface of the shade is fixed a colored translucent medium or sheet 125. These are so arranged that some of the apertures 24 are not covered while others are covered by the translucent material. Thus, light from an uncolored bulb 13 will pass through the uncovered apertures as white light, or the equivalent character, from colored bulbs while white light from the bulb 13 will also pass through the covered apertures as colored light and will illuminate said apertures. Colored bulbs will also combine to illuminate the apertures with a combination of the bulb color and the sheet color. In the rotation of the shade these various apertures, whether covered or uncovered, appear as scintillating jewels and, of course, illumination that passes through the openings also illuminates the entire supporting structure, such as a tree or wreath but, of course, to a more limited degree than the bulb 13 would illuminate the same if not provided with the device.

A single wire includes a plurality of spiral turns 25 which envelope the lamp bulb and the upper end terminates in an upwardly extending portion 26, terminating in a pivot forming point 27 which engages the spherical seat and thus the shade is not only pivotally supported on the point but is centrally supported.

As shown in the drawing, light bulb 13 has a bulb portion that, intermediate its ends, is enlarged laterally. This forms a restricted portion immediately above the socket receivable portion of the light bulb. The spiral coils 25 are successively of increasing diameter from the tip toward the opposite end of the wire and one spiral portion about the bulb adjacent the restricted portion thereof is of a diameter no greater than the diameter of the last or largest of the before mentioned successive bulb encircling spiral turns, and preferably is of a lesser diameter than the last of said successive spirals.

It is well known that Christmas tree lighting systems are comprised of six, eight, ten and twelve lamp bulbs usually connected in series, and that the heat discharged from the surface of the bulb is relatively small. It is, therefore, imperative in a construction of this kind that the shade substantially encloses the major portion of the bulb. The air within the shade and surrounding the bulb becomes heated when the bulb is energized so the filament therein produces light and this heated air rises within the shade and escapes through the apertures 19 and impinges in its escape upon the vanes 20 and thus the thrust of the escaping air secures rotation of the shade. The heated escaping air is replaced by the colder air which enters between the shade and the light bulb at the bottom of the shade.

In certain forms of the invention the plurality of coils 25 may be omitted and the portion 26 extended downwardly so as to directly connect the same with an extension 28 coiled about the bulb socket 12, the latter being supplied with current by the wires 29. In the present disclosure, however, the portion 26 is not directly connected to the portion 28 but is connected to the intermediate coiled portions 25.

Due to the small amount of heat generated and its relation to the friction in the bearing between the partially spherical seat and the pivot point 27, the lamp bulb must be positioned such that its axis is substantially vertical. Otherwise, the shades will not automatically rotate.

Whenever it is desired to insure predetermined fixed positioning, the portion 28 is extended and is suitably provided with a support clamping construction. The support clamping construction herein disclosed, is of a double clip type. It may be of any preferred type. The double clip type includes the two arms 30 and 31, each of which terminates in a jaw 32 and 33, respectively, and serrated as at 34, the serrations meshing when not engaging a support. A spring 35 normally insures movement of the clamping portions 32 and 33 towards each other and as will be noted, these teeth are arranged substantially at right angles to the commonly known battery terminal clamping construction.

In the present form of the construction, the end 28 is clampingly secured as by the screw 36 to the clamping construction. As previously indicated, the clamp construction, instead of being of the character indicated, may be formed as an integral extension of the member 28. The purpose of this clamp construction is to insure predetermined positioning of the lamp bulb socket so that the lamp bulb will have its axis substantially vertically positioned so that the pivot forming tip 27 will be vertically positioned and automatic rotation of the shade will result when the lamp bulb is lighted.

While herein the intermediate portions 28 and 25 are shown coiled about the socket and the bulb respectively, either or both of these clamping associations may be omitted. However, some form of association with either the bulb or socket is preferred so that even though the tip be maintained in a vertical position by means of the clamp construction, the light bulb and socket as a unit cannot cant therefrom to such a degree that it will obstruct the rotation of the shade, since by reason of the relatively small source of power and the relatively large amount of friction with reference thereto there is little surplus power and therefor central positioning of the lamp bulb is highly desirable to insure certainty of rotation of the shade.

While the invention has been described in great detail in the foregoing specification, the same is to be considered illustrative and not restrictive in character and various modifications thereof which will readily suggest themselves to persons skilled in this art, all are considered within the broad scope of this invention, reference being had to the appended claims.

The invention claimed is:—

1. The combination with a shade having a top with a central partially spherical seat and a concentric incline vaned apertured portion, a lamp bulb and a socket detachably receiving the bulb, of a single wire having a portion wound about the socket, another portion extending from the socket engaging portion encircling and extending toward the end of the bulb, and a pointed tip extending axially from the second mentioned portion and axially positioned relative to the bulb and immediately above the bulb and engageable by said seat.

2. In combination with a light bulb having an intermediate enlarged portion between its ends, a rotatable shade having a central pivot bearing, a vaned portion and a bulb enveloping skirt portion, and a shade supporting member comprising a wire body provided at its upper end with an axial shade supporting pivot and with a plurality of helical turns of progressively increasing diameter downwardly from said shade supporting pivot, said body also including at least a portion of an additional helical turn below the first mentioned helical turns and of a diameter less than the largest diameter of the said first mentioned helical turns when mounted on the bulb, said helical turns being so constructed and arranged as to nestingly envelop the lamp above and below the enlarged portion thereof.

3. In combination with a light bulb having an intermediate enlarged portion between its ends, a rotatable shade having a central pivot bearing, a vaned portion and a bulb enveloping skirt portion, and a shade supporting member comprising a single length of wire provided at its upper end with a shade supporting tip positioned to coincide with the longitudinal axis of the bulb and with a plurality of helical turns, each successive turn being of increasing diameter longitudinally of the lamp, said body including at least a portion of an additional helical turn below the first mentioned helical turns and of a diameter no greater than the largest diameter of the said first mentioned helical turns, and a support for said wire body including a clamp connected to the wire at the end opposite said tip portion for simultaneously positioning the bulb and pivot in predetermined relation to a support.

4. In combination with a light bulb having an intermediate enlarged bulb portion between its ends, a socket for said light bulb, a rotatable shade having a central pivot bearing surrounded by a vaned portion, and also having a depending bulb enveloping skirt portion, an operative connection between the shade and the bulb comprising a single length of wire provided with helical coils having at its upper end a pointed shade supporting pivot in alignment with the longitudinal axis of the bulb, the coils of said body being of successively increasing diameter from said tip toward the bottom of the body, and at least a portion of an additional helical turn below the last mentioned turns and opposite the top portion of a diameter less than the largest diameter of the first mentioned helical turns when mounted on the bulb and so constructed and arranged as to nestingly envelop the bulb above and below the enlarged portion, and a support for said wire body including a clamp connected to the wire at the end opposite from the top thereof, and simultaneously positioning the bulb socket and pivot in predetermined positions upon a support.

5. In combination with a light bulb having an intermediate enlarged portion between its ends, a socket for said light bulb, a rotatable shade having a central pivot bearing, a vaned portion and a bulb enveloping skirt portion, and a shade supporting member comprising a wire body formed of a single piece of wire and provided at its upper end with an axial shade supporting pivot, and with a plurality of helical turns of progressively increasing diameter from the top of the lamp downward so as to nestingly engage the lamp, said body also including at least a portion of an additional helical turn below the first mentioned helical turns and of a diameter less than the largest diameter of the largest of the first mentioned helical turns when mounted on the bulb, said body being so constructed and arranged as to nestingly envelop the bulb above and below the enlarged portion thereof, and a support for said spiral including a clamp connected to the wire at the lower end of said body, for simultaneously positioning the bulb socket and pivot in predetermined position upon a support, the wire below the last mentioned turn having a helical portion encircling said socket.

6. In a Christmas-tree-light ornament, a shade-supporting member comprising a bulb-engageable wire body provided with a plurality of helical turns so constructed and arranged as to encircle a lamp bulb, the diameter of said turns progressively increasing from the top of the lamp to the part of the lamp of greatest diameter, with an additional portion of less diameter than the largest normal diameter of the lamp bulb and adapted to engage the bulb below its greatest diameter, and an axially disposed shade-supporting pivot member projecting from the smaller end of said body.

7. In combination with a light bulb having an intermediate enlarged portion between its ends, and a rotatable shade having a central pivot bearing, a vane portion and a bulb enveloping skirt, a shade supporting member including a single wire body provided at its upper end with an axial shade supporting pivot and with a plurality of turns, certain of said turns being concentric with said bulb and at least one portion of one turn peripherally contacting said bulb above the enlarged portion, said body also including at least a portion of an additional turn below the last mentioned turn portion and of a diameter less than the largest diameter of said bulb enlargement when mounted on a bulb and engaging said bulb below the same for clamping mounting of the body upon the bulb for relative rigid alignment of said bulb and pivot.

8. In combination with a light bulb, a socket supporting the same, and a rotatable shade having a central pivot bearing, a vane portion and a bulb enveloping skirt, a shade supporting member including a single wire having a plurality of successive turns, at least one turn encircling in embracing relation said socket and a plurality of other turns peripherally enveloping the lamp bulb when mounted in the socket, and an axially aligned tip spaced from the free end of the bulb when the latter is mounted in the socket and extended oppositely from the bulb tip as a continuation of one end turn, said tip pivotally supporting said shade in bulb enveloping relation and operatively engaging the central pivot bearing.

9. In combination with a light bulb having an intermediate enlarged portion between its ends, a socket supporting the light bulb and a rotatable shade having a central pivot bearing, a vane portion and a bulb enveloping skirt, a shade supporting member including a single wire body having a plurality of successive turns at least one turn encircling in embracing relation said socket and a plurality of other turns peripherally enveloping the lamp bulb when mounted in the socket, a portion of at least one of said lamp bulb peripherally enveloping turns contacting said bulb above the enlarged portion and at least a portion of an additional turn below the last mentioned turn portion and above the socket engaging turn being of a diameter less than the largest diameter of said bulb enlargement when mounted thereon and engaging said bulb below the enlargement for clamping mounting of the body upon the bulb, and an axially aligned tip spaced from the free end of the bulb and extending oppositely therefrom as a continuation of one end turn of the body, said tip pivotally supporting said shade in bulb enveloping relation and operatively engaging the central pivot bearing for axial alignment of the shade, pivot and bulb.

CURTISS J. McCOY.